(12) United States Patent
Sasaki et al.

(10) Patent No.: US 11,954,155 B2
(45) Date of Patent: Apr. 9, 2024

(54) INFORMATION PROCESSING DEVICE, INFORMATION PROCESSING METHOD, AND NON-TRANSITORY COMPUTER READABLE STORAGE MEDIUM

(71) Applicant: Yahoo Japan Corporation, Tokyo (JP)

(72) Inventors: Kiyoshi Sasaki, Tokyo (JP); Akira Tajima, Tokyo (JP); Takahiro Ishikawa, Tokyo (JP); Koji Tsukamoto, Tokyo (JP); Seira Nakamura, Tokyo (JP); Kazuki Nakayama, Tokyo (JP)

(73) Assignee: Yahoo Japan Corporation, Tokyo (JP)

( * ) Notice: Subject to any disclaimer, the term of this patent is extended or adjusted under 35 U.S.C. 154(b) by 0 days.

(21) Appl. No.: 17/690,882

(22) Filed: Mar. 9, 2022

(65) Prior Publication Data
US 2022/0374472 A1 Nov. 24, 2022

(30) Foreign Application Priority Data
May 20, 2021 (JP) .................................. 2021-085604

(51) Int. Cl.
*G06F 16/906* (2019.01)
(52) U.S. Cl.
CPC .................. *G06F 16/906* (2019.01)
(58) Field of Classification Search
CPC .................................................. G06F 16/906
See application file for complete search history.

(56) References Cited

U.S. PATENT DOCUMENTS

| | | | |
|---|---|---|---|
| 11,580,153 B1* | 2/2023 | Liao | G06F 16/951 |
| 2020/0364275 A1* | 11/2020 | Liu | G06Q 50/01 |
| 2020/0401580 A1* | 12/2020 | Fitzpatrick | G06F 16/24578 |

FOREIGN PATENT DOCUMENTS

JP 2019-046185 A 3/2019

OTHER PUBLICATIONS

The Japanese Patent Office, Notification of Reason for Refusal, Application No. JP2021-085604, dated Feb. 15, 2022, in 7 pages.

* cited by examiner

*Primary Examiner* — Mark D Featherstone
*Assistant Examiner* — Xiaoqin Hu
(74) *Attorney, Agent, or Firm* — Procopio, Cory, Hargreaves & Savitch LLP

(57) ABSTRACT

An information processing device according to the present application includes a generation unit and a providing unit. The generation unit uses a model that is trained to learn a relationship between a criterion for classifying users of a first company and a criterion for classifying users of a second company to generate a criterion (common key) for classifying the users of the second company into a first category, from the criterion for classifying the users of the first company into the first category. The providing unit provides a criterion generated by the generation unit.

5 Claims, 8 Drawing Sheets

FIG.3

| USER ID | NUMBER OF CARS OWNED | FREQUENCY OF DRIVING (TIMES/WEEK) | ... |
|---------|----------------------|-----------------------------------|-----|
| U11a | 1 | 1 | ... |
| U12a | 0 | 0 | ... |
| U13a | 3 | 4 | ... |
| U14a | 2 | 6 | ... |
| ... | ... | ... | ... |

| USER ID | CAR PRODUCT PURCHASE FREQUENCY (TIMES/MONTH) | CAR-RELATED KEYWORD INPUT FREQUENCY (TIMES/MONTH) | ... |
|---------|----------------------------------------------|---------------------------------------------------|-----|
| U13b | 2 | 4 | ... |
| U14b | 5 | 25 | ... |
| U15b | 0 | 89 | ... |
| U16b | 3 | 122 | ... |
| ... | ... | ... | ... |

INFORMATION PROCESSING DEVICE, INFORMATION PROCESSING METHOD, AND NON-TRANSITORY COMPUTER READABLE STORAGE MEDIUM

CROSS-REFERENCE TO RELATED APPLICATIONS

The present application claims priority to and incorporates by reference the entire contents of Japanese Patent Application No. 2021-085604 filed in Japan on May 20, 2021.

BACKGROUND OF THE INVENTION

1. Field of the Invention

The present invention relates to an information processing device, an information processing method, and an information processing program.

2. Description of the Related Art

Conventionally, there has been proposed a conventional technology to share data between a plurality of companies whose data are held using different platforms.

For example, any of the companies can use statistical information obtained from data about users provided from another company, for marketing or the like.

However, the conventional art has a problem that the statistical information cannot be readily obtained from sets of data of different companies, in some cases.

For example, in order to implement data sharing provided by a technology described in Patent Literature 1, it is necessary to prepare metadata for describing entity data in each company in advance and share the metadata between the companies.

Furthermore, from the viewpoint of personal information protection, it is undesirable to share data from which a user can be identified between companies, in some cases.

SUMMARY OF THE INVENTION

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Modes for carrying out an information processing device, an information processing method, and an information processing program according to the present application (hereinafter, referred to as "embodiments") will be described in detail below with reference to the drawings. Note that the information processing device, the information processing method, and the information processing program according to the present application are not limited to the embodiments described below. In addition, the embodiments described below can be appropriately combined within a range consistent with processing contents. Furthermore, in the following description of the embodiments, the same portions are denoted by the same reference numerals and symbols, and repetitive description thereof will be omitted.

1. Overview of Information Processing

Figure 1:
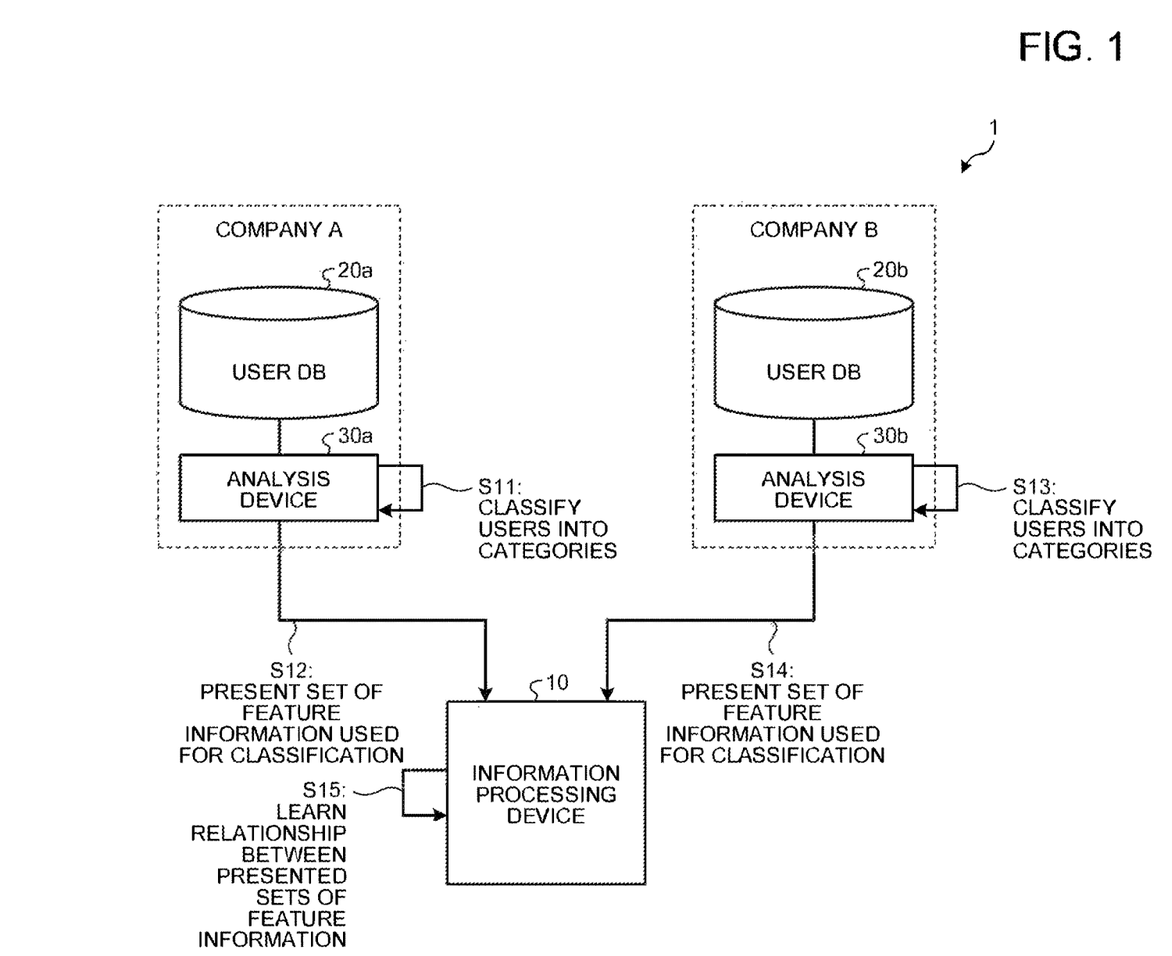
FIG. 1 is a diagram illustrating an example of information processing according to an embodiment.

Hereinafter, an example of information processing according to an embodiment will be described with reference to the drawings. FIG. 1 is a diagram illustrating an example of information processing according to the embodiment.

As illustrated in FIG. 1, an information providing system 1 according to the embodiment includes an information processing device 10, a user DB 20*a*, an analysis device 30*a*, a user DB 20*b*, and an analysis device 30*b*.

The information processing device 10, the analysis device 30*a*, and the analysis device 30*b* are each connected to a network N (e.g., see, FIG. 8) in a wired or wireless manner.

The network N is a communication network such as a local area network (LAN), a wide area network (WAN), a telephone network (mobile telephone network, fixed telephone networks, etc.), a regional Internet protocol (IP) network, or the Internet. The network N may include a wired network or a wireless network.

The information processing device 10, the analysis device 30*a*, and the analysis device 30*b* are configured to communicate with each other through the network N.

The user DB 20*a* illustrated in FIG. 1 is a database that stores information about users using a service provided by a company A. Furthermore, the user DB 20*b* is a database that stores information about users using a service provided by a company B.

In the present embodiment, it is assumed that the company A and the company B are not allowed to exchange information that is stored in each user DB and from which personal information of each user can be identified.

On the other hand, the company A and the company B are allowed to exchange statistical information that is calculated on the basis of information stored in each user DB and from which the personal information of each user cannot be identified.

For example, each of the company A and the company B can provide any statistical information that is calculated from user information obtained in units of a predetermined number of people (e.g., 10 people) or more, to each other.

The analysis device 30a and the analysis device 30b each classify the users into categories on the basis of the information stored in each of the user DB 20a and the user DB 20b by using a method such as clustering.

In addition, the analysis device 30a and the analysis device 30b each calculate the statistical information on the basis of the user information input. For example, the analysis device 30a and the analysis device 30b each calculate the statistical information that indicates a purchase tendency of the users for each classified cluster.

Here, it is assumed that the company A sells a specific product such as an automobile, and the company B provides various services (search engine, shopping site) on the Internet via online content such as a portal site.

In this case, for example, it is conceivable that the company A receives data about the interests and the purchase tendencies of the users from the company B in order to identify a user who is likely to purchase the automobile of the company A.

At that time, as described above, reception and transmission of the information from which the personal information of each user can be identified is restricted between the company A and the company B, and therefore, the company A specifies a category and receives the statistical information about users corresponding to the category from the company B.

However, it is conceivable that items of managed data are different between the user DB 20a and the user DB 20b. Therefore, a criterion for classifying users registered in the user DB 20a of the company A into a category of "car buff" cannot be always used as a criterion for classifying users registered in the user DB 20b of the company B into the category of "car buff."

Therefore, the information providing system 1 generates a criterion for classifying the users into a category similar to that of the company A in the company B, and provides the criterion to the company B. In the following description, the criterion generated by the information providing system 1 is referred to as a common key.

Figure 2:
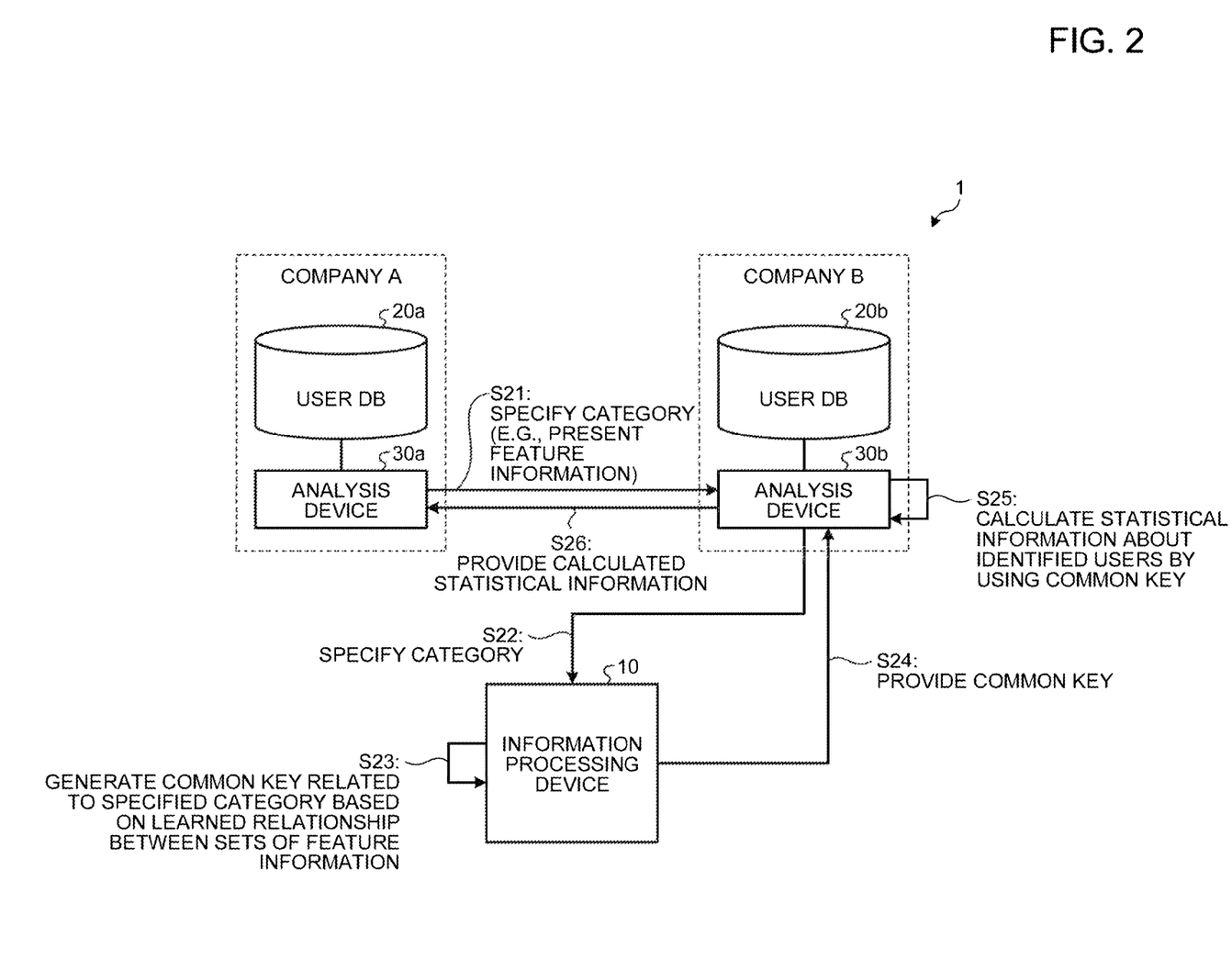
FIG. 2 is a diagram illustrating an example of information processing according to an embodiment.

Processes performed by the information providing system 1 will be described with reference to FIGS. 1 and 2. FIGS. 1 and 2 are diagrams each illustrating information processing according to the embodiment. The information providing system 1 performs a training process of training a model that generates the common key and a generation process of generating the common key using the trained model.

FIG. 1 illustrates the training process. FIG. 2 illustrates the generation process. Note that the training process corresponds to a process in a training phase of machine learning, and the generation process corresponds to a process in an inference phase of the machine learning.

First, as illustrated in FIG. 1, the analysis device 30a classifies users registered in the user DB 20a into categories (Step S11). Then, the analysis device 30a presents a set of feature information used for the classification of the users to the information processing device 10 (Step S12).

Likewise, the analysis device 30b classifies the users registered in the user DB 20b into categories (Step S13). Then, the analysis device 30b presents a set of feature information used for the classification of the user to the information processing device 10 (Step S14).

The analysis device 30a and the analysis device 30b may classify the users according to a predetermined rule, or may classify the users by using a statistical analysis method such as clustering.

For example, the feature information represents conditions for the items and values in a table included in the user DB 20a or the user DB 20b. Furthermore, the feature information may be a space configured by a feature amount represented by a vector.

The information processing device 10 trains the model to learn a relationship between the presented sets of feature information (Step S15).

Next, as illustrated in FIG. 2, the analysis device 30a specifies a category to the analysis device 30b (Step S21). At this time, the analysis device 30a may specify the category by presenting the feature information.

This configuration makes it possible for the company A to request the statistical information about the users corresponding to the specified category in the user DB 20b of the company B, from the company B.

The analysis device 30b further specifies the category specified by the analysis device 30a for the information processing device 10 (Step S22).

The information processing device 10 generates the common key related to the category notified of on the basis of the learned relationship between the sets of feature information (Step S23). In other words, the information processing device 10 generates the common key by using the model after the training in the process of FIG. 1.

The information processing device 10 provides the generated common key to the analysis device 30b (Step S24).

The analysis device 30b calculates the statistical information about users who are identified from the user DB 20b by using the provided common key (Step S25). Then, the analysis device 30b provides the calculated statistical information to the analysis device 30a (Step S26).

Figure 3:
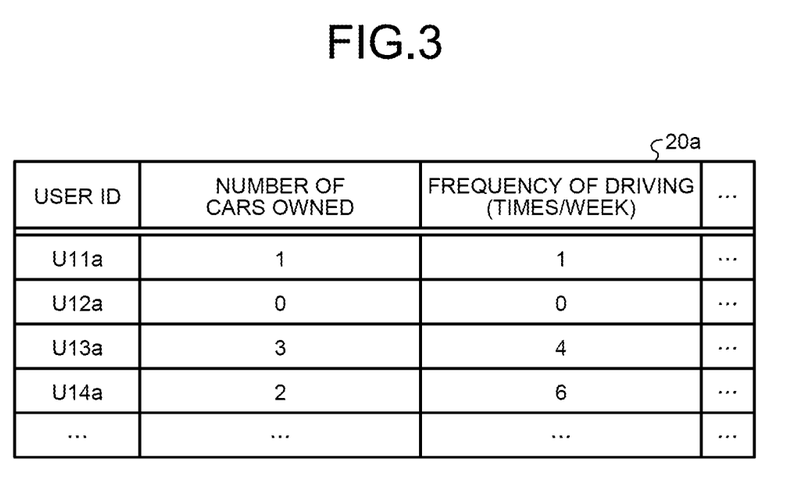
FIG. 3 is a table illustrating an example of a user DB according to an embodiment.

FIG. 3 is a diagram illustrating an example of the user DB according to the embodiment. Furthermore, FIG. 4 is a table illustrating an example of the user DB according to the embodiment.

Figure 4:
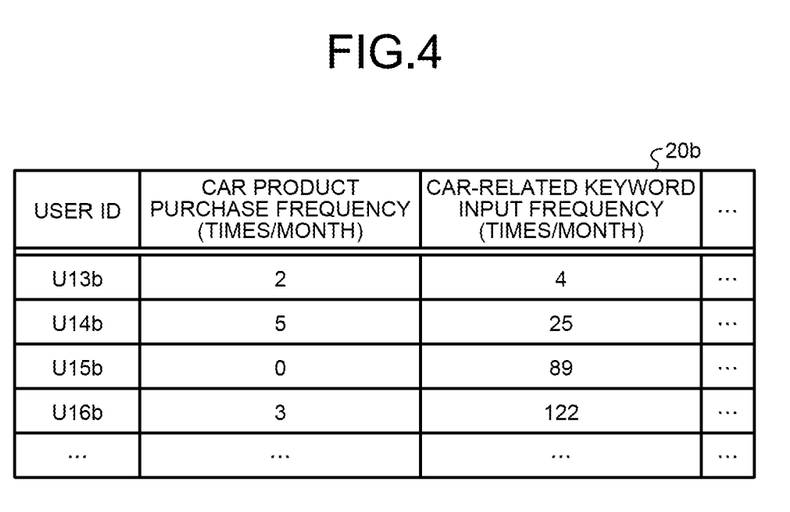
FIG. 4 is a table illustrating an example of the user DB according to an embodiment.

As illustrated in FIG. 3, the user DB 20a of the company A includes items such as "number of cars owned" and "frequency of driving (times/week)." Furthermore, as illustrated in FIG. 4, the user DB 20b of the company B includes items such as "car product purchase frequency (times/month)" and "car-related keyword input frequency (times/month)."

Figure 5:
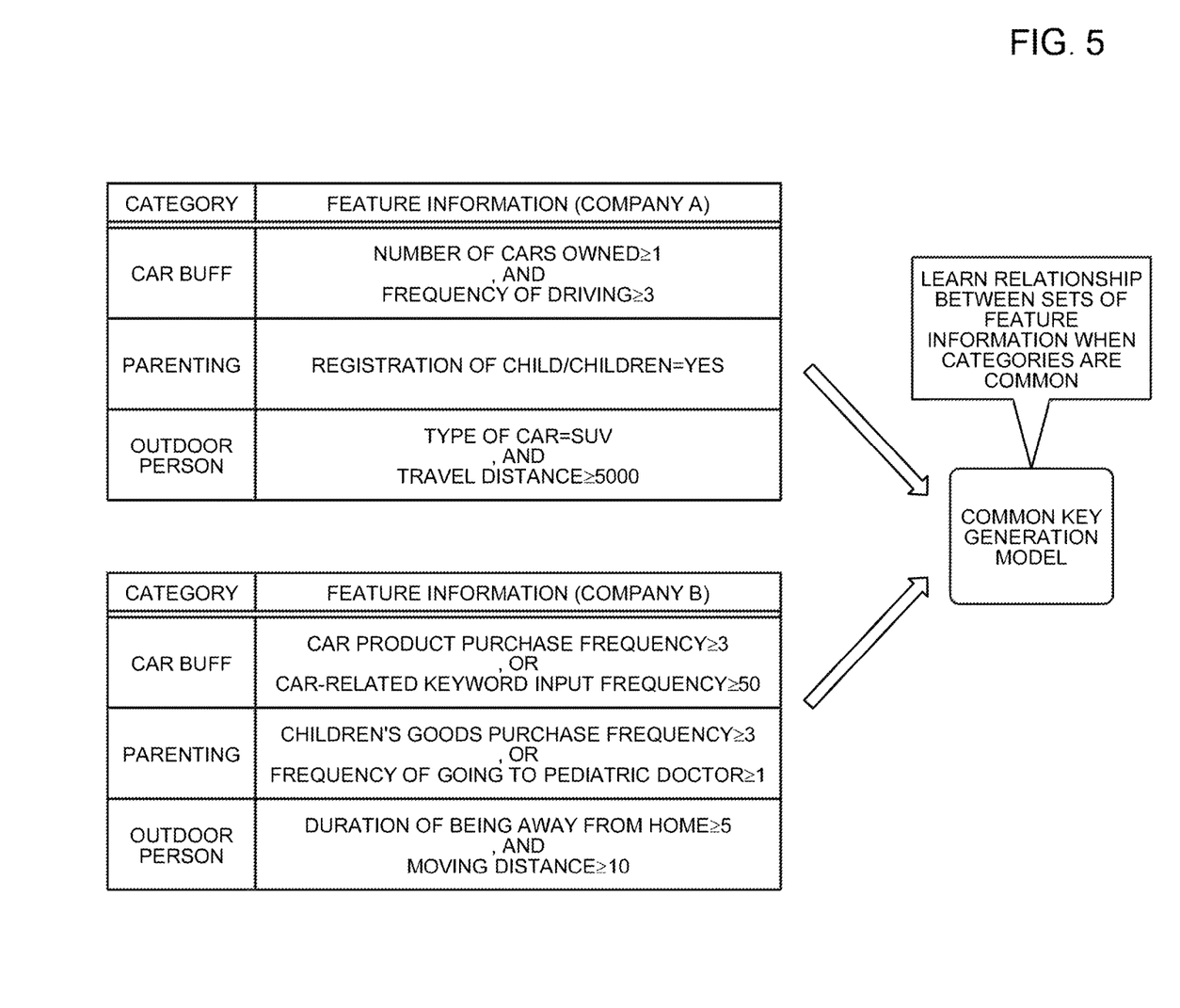
FIG. 5 is a diagram illustrating an example of a training process according to an embodiment.

The training process will be specifically described with reference to FIG. 5. FIG. 5 is a diagram illustrating an example of the training process according to the embodiment. A common key generation model is a model for which the training is performed by the information processing device 10.

The feature information (company A) is the set of feature information that is presented by the analysis device 30a to the information processing device 10 in Step S12. The feature information (company B) is the set of feature information that is presented by the analysis device 30b to the information processing device 10 in Step S14.

Information in which a set of feature information and a category are associated with each other is input to the common key generation model. In the example of FIG. 5, categories such as "car buff," "parenting," and "outdoor person" that are common to the company A and the company B and the sets of feature information for classifying the users into these categories are input to the common key generation model.

Then, the training makes it possible for the common key generation model to estimate that the relevance between the pieces of feature information is high when the categories are common.

For example, for the category "car buff," the common key generation model can derive A set of feature information of the company B "car product purchase frequency≥3, or car-related keyword input frequency≥50" from the set of feature information of the company A "number of cars owned≥1, and frequency of driving≥3."

Note that "registration of child/children," "type of car," and "travel distance" are items included in the user DB 20*a*. Furthermore, "children's goods purchase frequency," "frequency of going to pediatric doctor," "duration of being away from home," and "moving distance" are items included in the user DB 20*b*.

In addition, in the example of FIG. 5, meaningful names such as "car buff," "parenting," and "outdoor person" are given to the categories. Meanwhile, the category may not have so particular meaning, as long as the category is information from which whether the feature information is common between the companies can be determined.

Figure 6:
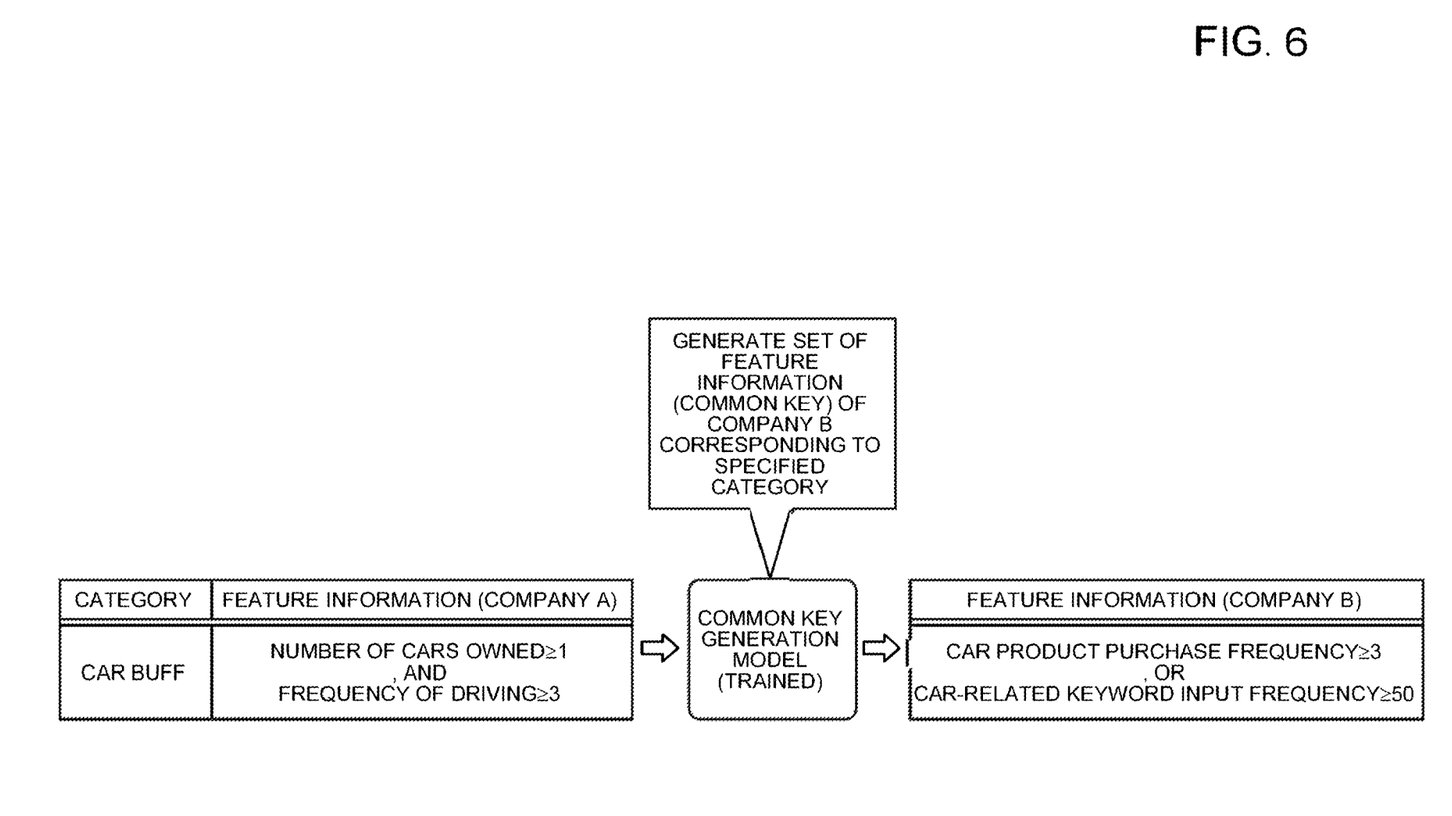
FIG. 6 is a diagram illustrating an example of a generation process according to an embodiment.
Figure 7:
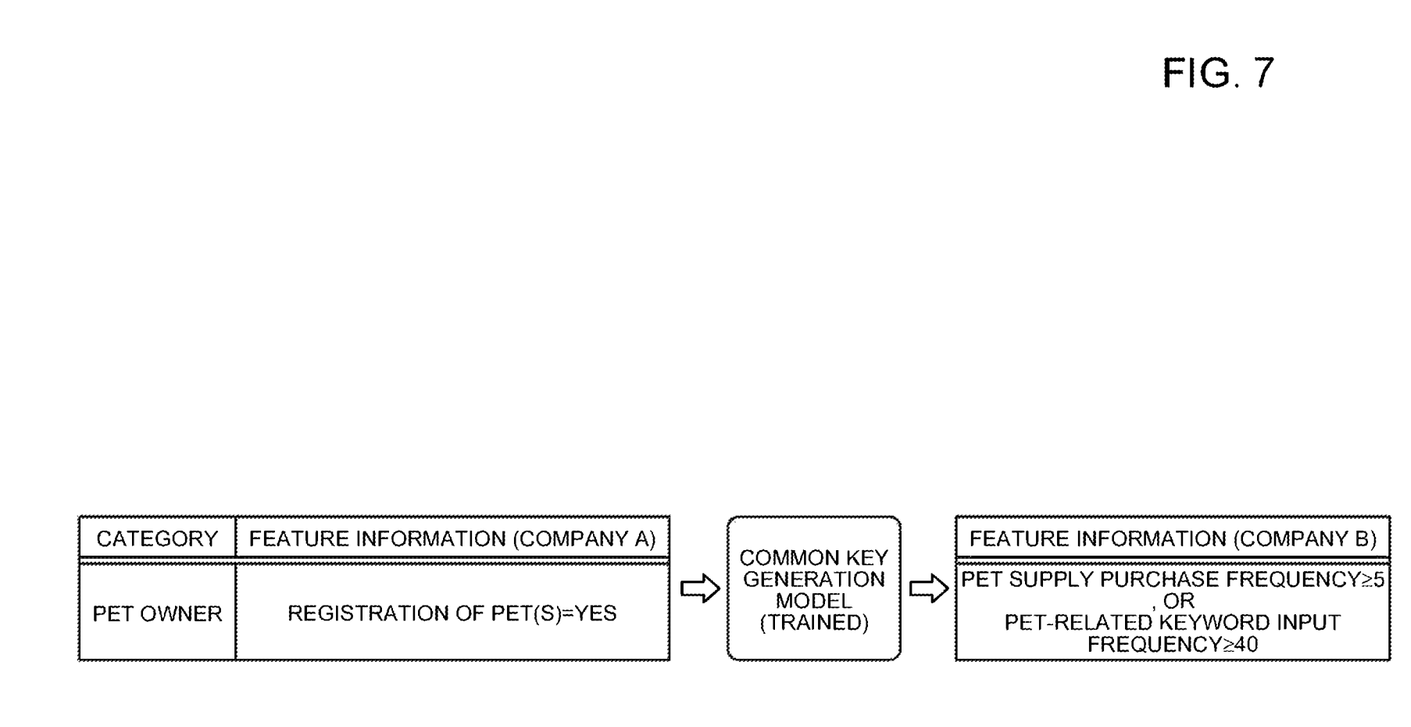
FIG. 7 is a diagram illustrating an example of a generation process according to an embodiment.

The common key generation process will be specifically described with reference to FIGS. 6 and 7. FIGS. 6 and 7 are diagrams each illustrating an example of the generation process according to the embodiment.

As illustrated in FIG. 6, the set of feature information of the company A associated with the category is input to the trained common key generation model. Then, the common key generation model outputs the set of feature information of the company B.

For example, the analysis device 30*b* searches the user DB 20*b* by using the piece of feature information (common key) "car product purchase frequency=3, or car-related keyword input frequency≥50," and thus, the users who are classified into the category "car buff" can be identified.

Furthermore, it is conceivable that a set of feature information of the company A that has not been input to the common key generation model in the training process may be input to the common key generation model in the generation process.

In FIG. 7, It is assumed that, for a category "pet owner", a set of feature information of the company A "registration of pet(s)=yes" has not been input in the training process. Even in such a case, the common key generation model is configured to output a set of feature information of the company B "pet supply purchase frequency≥5, or pet-related keyword input frequency≥40" on the basis of the tendency of the learned relationship between the sets of feature information of other categories.

2. Configuration of Information Processing Device

Figure 8:
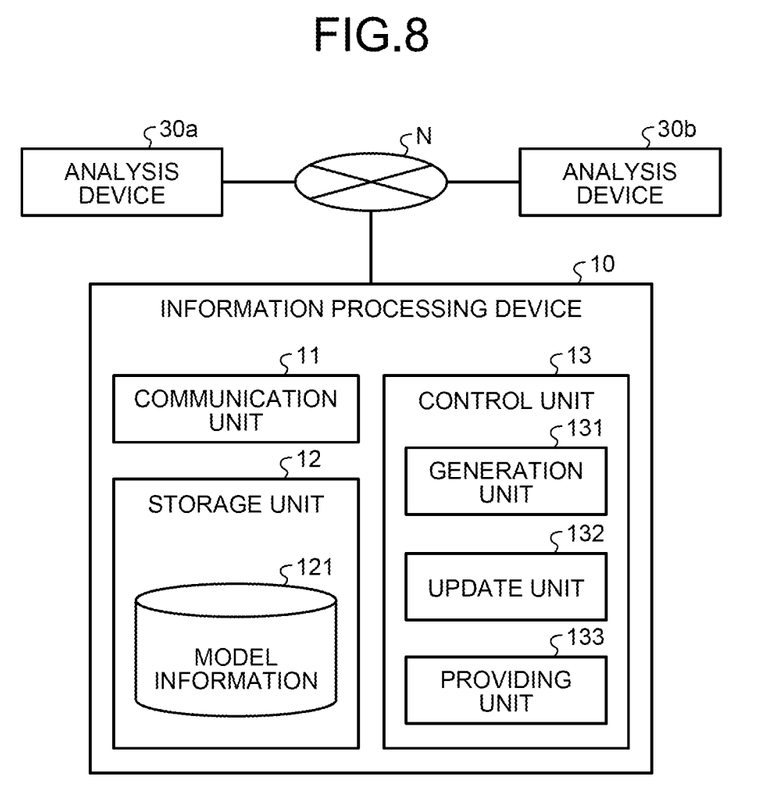
FIG. 8 is a diagram illustrating a configuration example of an information processing device according to an embodiment.

A configuration of the information processing device 10 according to the embodiment will be described with reference to FIG. 8. FIG. 8 is a diagram illustrating a configuration example of the information processing device according to the embodiment.

As illustrated in FIG. 8, the information processing device 10 includes a communication unit 11, a storage unit 12, and a control unit 13. Note that the information processing device 10 may include another functional unit other than the functional units illustrated in FIG. 8.

For example, the communication unit 11 is connected to the network N in a wired or wireless manner, and transmits and receives information to and from another device. The communication unit 11 is implemented by, for example, a network interface card (NIC) or antenna. The network N is a communication network such as a local area network (LAN), a wide area network (WAN), a telephone network (mobile telephone network, fixed telephone networks, etc.), a regional Internet protocol (IP) network, or the Internet. The network N may include a wired network or a wireless network.

The communication unit 11 receives sets of information that identifies the categories or the sets of feature information from the analysis device 30*a* and the analysis device 30*b*. Furthermore, the communication unit 11 transmits the common key to the analysis device 30*a*.

The storage unit 12 is implemented by a storage device, including a random access memory (RAM), semiconductor memory device such as a flash memory, or storage device such as a hard disk or an optical disk. The storage unit 12 stores programs and data for implementing information processing performed by the respective units of the control unit 13.

The storage unit 12 stores model information 121. The model information 121 is information such as parameters for building the common key generation model. In the training process, the information processing device 10 updates the model information 121. In the generation process, the information processing device 10 builds the trained common key generation model from the model information 121.

The control unit 13 is a controller that controls the information processing device 10. The control unit 13 is implemented by executing various programs (e.g., information processing program) that are stored in the storage device in the information processing device 10 by a central processing unit (CPU), micro processing unit (MPU), or the like, with the RAM as a working area. Furthermore, the control unit 13 may be implemented by an integrated circuit such as an application specific integrated circuit (ASIC) or a field programmable gate array (FPGA).

As illustrated in FIG. 8, the control unit 13 includes a generation unit 131, an update unit 132, and a providing unit 133. The control unit 13 implements or executes the function or action of information processing which is described below by these units. Note that an internal configuration of the control unit 13 is not limited to the configuration illustrated in FIG. 8, and the control unit 13 may employ another configuration, as long as the another configuration is configured to perform information processing which is described later.

The generation unit 131 uses a model that is trained to learn a relationship between a criterion for classifying the users of the company A and a criterion for classifying the users of the company B to generate a criterion for classifying the users of the company B into a first category, from a criterion for classifying the users of the company A into the first category.

The company A is an example of a first company. The company B is an example of a second company. Furthermore, in the example of FIG. 6, the first category is "car buff." In addition, the criterion generated by the generation unit 131 is the common key.

The generation unit 131 uses the model to identify an item in the company B that is common to an item for classifying the users of the company A into the first category, and generates the common key by using the identified item.

For example, likewise the user DB 20a of the company A illustrated in FIG. 3, in a case where the user DB 20b of the company B also has items of "number of cars owned" and "frequency of driving (times/week)," the generation unit 131 is configured to use the feature information (company A) associated with the category "car buff" of FIG. 5 as the common key that can be used also by the company B.

The generation unit 131 uses the model that is trained to learn a relationship between a label for each cluster obtained by clustering the users of the company A and a label for each cluster obtained by clustering the users of the company B to generate the criterion.

For example, the generation unit 131 uses the model that is trained to learn a relationship between a classification criterion for a cluster to which the label "car buff" is given in the company A and a classification criterion for a cluster to which the label "car buff" is given in the company B to generate the common key corresponding to the category "car buff."

The update unit 132 updates the common key generation model in the training process. For example, the update unit 132 updates the model information 121.

The providing unit 133 provides a criterion generated by the generation unit 131. For example, the providing unit 133 provides the common key generated by the generation unit 131 to the analysis device 30b.

3. Process Procedures

Figure 9:
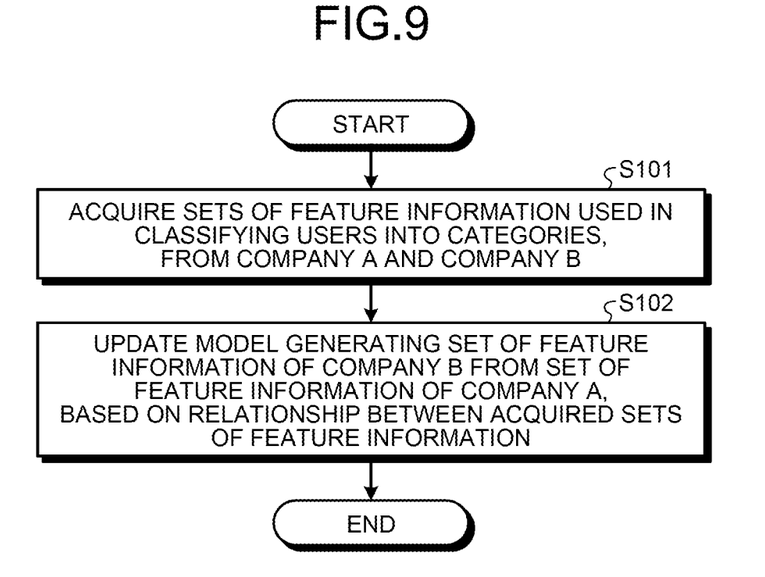
FIG. 9 is a flowchart illustrating an example of the procedure of the training process according to an embodiment.

The procedure of the training process performed by the information processing device 10 according to the embodiment will be described with reference to FIG. 9. FIG. 9 is a flowchart illustrating an example of the procedure of the training process according to the embodiment.

As illustrated in FIG. 9, first, the information processing device 10 acquires sets of feature information used in classifying the users into categories, from the company A and the company B (Step S101).

Then, the information processing device 10 updates the model generating the set of feature information of the company B from the set of feature information of the company A, on the basis of a relationship between the acquired sets of feature information (Step S102).

For example, the model receives, as an input, a set of feature information for classifying users into a specific category in the company A, and outputs a set of feature information for classifying users of the company B into the same category.

Figure 10:
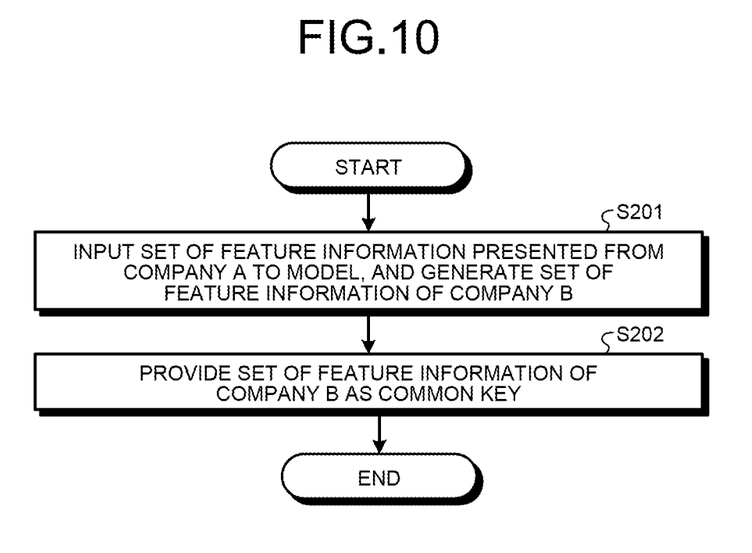
FIG. 10 is a flowchart illustrating an example of the procedure of the generation process according to an embodiment.

The procedure of the generation process performed by the information processing device 10 according to the embodiment will be described with reference to FIG. 10. FIG. 10 is a flowchart illustrating an example of the procedure of the generation process according to the embodiment.

As illustrated in FIG. 10, first, the information processing device 10 inputs a set of feature information presented from the company A to the model, and generates the set of feature information of the company B (Step S201).

The information processing device 10 provides the set of feature information of the company B, as the common key (Step S202). For example, the information processing device 10 provides the common key to the analysis device 30b. The analysis device 30b calculates the statistical information about the users who are identified from the user DB 20b by using the provided common key, and provides the calculated statistical information to the analysis device 30a.

4. Hardware Configuration

Figure 11:
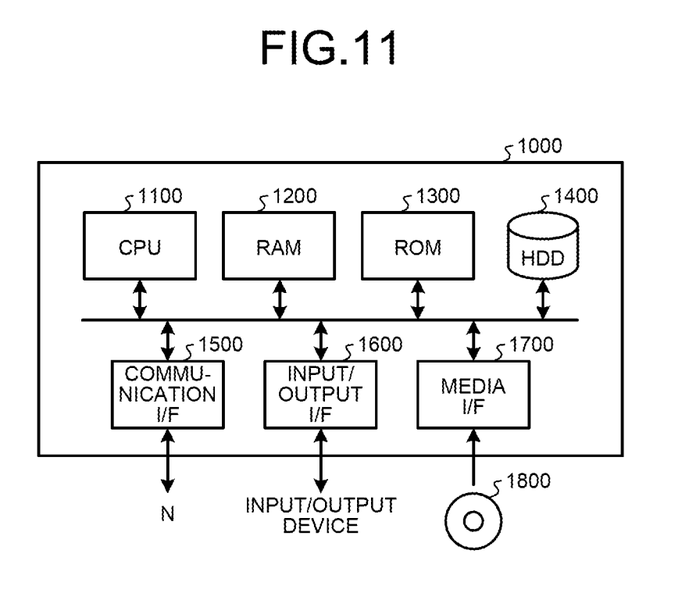
FIG. 11 is a hardware configuration diagram illustrating an example of a computer implementing the functions of the information processing device according to an embodiment.

The information processing device 10 according to the embodiments is implemented by, for example, a computer 1000 having a configuration as illustrated in FIG. 11. FIG. 11 is a hardware configuration diagram illustrating an example of the computer implementing the functions of the information processing device according to the embodiment.

The computer 1000 includes a CPU 1100, a RAM 1200, a ROM 1300, an HDD 1400, a communication interface (I/F) 1500, an input/output interface (I/F) 1600, and a media interface (I/F) 1700.

The CPU 1100 operates on the basis of a program stored in the ROM 1300 or the HDD 1400, and controls each unit. The ROM 1300 stores a boot program executed by the CPU 1100 when the computer 1000 is activated, a program depending on hardware of the computer 1000, and the like.

The HDD 1400 stores a program executed by the CPU 1100, data used for the program, and the like. The communication interface 1500 receives data from another device via the network (communication network) N, transmits the data to the CPU 1100, and transmits data generated by the CPU 1100 to another device via the network (communication network) N.

The CPU 1100 controls an output device such as a display or a printer and an input device such as a keyboard or a mouse, via the input/output interface 1600. The CPU 1100 acquires data from the input device via the input/output interface 1600. In addition, the CPU 1100 outputs the generated data to the output device via the input/output interface 1600.

The media interface 1700 reads a program or data stored in a recording medium 1800 and provides the program or data to the CPU 1100 via the RAM 1200. The CPU 1100 loads the program from the recording medium 1800 into the RAM 1200 via the media interface 1700, and executes the loaded program. Note that the recording medium 1800 is an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, when the computer 1000 functions as the information processing device 10 according to the embodiment, the CPU 1100 of the computer 1000 executes a program loaded into the RAM 1200, implementing the function of the control unit 13. In addition, the HDD 1400 stores data in the storage unit 12. The CPU 1100 of the computer 1000 executes these programs read from the recording medium 1800, but in another example, these programs may be acquired from another device via the network (communication network) N.

5. Others

In the processes described in the embodiments and modifications described above, all or part of the processes described as an automatic process can be manually performed, or all or part of the processes described as a manual process can be automatically performed by a known method. In addition, the process procedures, specific names, information including various data and parameters which have been described in the specification and which have been illustrated in the drawings can be appropriately changed unless otherwise specified.

In the embodiments and modifications described above, in order to implement the information processing method (see FIG. 8) by the information processing device 10, the processing functions corresponding to the respective units (generation unit 131, update unit 132, and providing unit 133) of the control unit 13 included in the information processing device 10 may be implemented as an add-on to the information processing program installed in advance in the information processing device 10, or may be implemented by being flexibly written as a dedicated information processing program by using a lightweight language or the like.

In addition, each component element of each device illustrated in the drawings is a functional concept, and may not be necessarily physically configured as illustrated in the drawings. In other words, specific forms of distribution and integration of the respective devices are not limited to the illustrated forms, and all or some of the devices can be functionally or physically distributed and integrated in an appropriate unit according to various loads, usage conditions, and the like. For example, the generation unit 131 of the control unit 13 may be functionally distributed into a function of building the model from the model information 121 and a function of generating the common key by using the model.

In addition, the embodiments and modifications described above can be appropriately combined within a range consistent with the processing contents.

6. Effects

The information processing device 10 according to the embodiments described above includes the generation unit 131 and the providing unit 133. The generation unit 131 uses a model that is trained to learn the relationship between a criterion for classifying the users of the first company and a criterion for classifying the users of the second company to generate a criterion (common key) for classifying the users of the second company into the first category, from a criterion for classifying the users of the first company into the first category. The providing unit 133 provides a criterion generated by the generation unit 131.

Therefore, the information processing device 10 can use the model trained to learn the classification criterion for the users between the companies, and thus, it is not necessary to prepare information about data between the companies in advance. Thus, according to the present embodiment, the statistical information can be readily obtained from the sets of data of different companies.

In the information processing device 10 according to the embodiments, the generation unit 131 uses the model to identify an item in the second company that is common to an item for classifying the users of the first company into the first category, and generates the criterion by using the identified item. This configuration makes it possible for the information processing device 10 to more readily generate the common key when there is a common item.

Furthermore, in the information processing device 10 according to the embodiments, the generation unit 131 uses a model that is trained to learn a relationship between a label for each cluster obtained by clustering the users of the first company and a label for each cluster obtained by clustering the users of the second company to generate the criterion. In this manner, it is possible for the information processing device 10 to generate the common key by using a result of the clustering performed in each of the companies.

While the embodiments of the present application have been described in detail with reference to the drawings, these are merely examples, and the present invention can be implemented in other modes for which various modifications and improvements are made on the basis of the knowledge of those skilled in the art, including the aspects described in disclosure of the invention.

Furthermore, "section," "module," or "unit" described above can be read as "means," "circuit," or the like. For example, the generation unit can be read as determination means or a determination circuit.

According to one aspect of the embodiment, it is easy to effectively obtain the statistical information from the sets of data of different companies.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device comprising:
a processor configured to use a model trained to learn a relationship between a criterion related to a keyword input frequency for classifying users of a first company and a criterion for classifying users of a second company to generate a criterion for classifying the users of the second company that provides services on internet into a first category from the criterion for classifying the users of the first company into the first category; and
the processor is configured to provide the generated criterion to a first analysis device associated with the second company to generate statistical information based on the users of the second company that have been classified into the first category,
wherein the first analysis device provides the generated statistical information to a second analysis device associated with the first company without providing the second analysis device access to personal information of the users of the second company, and
wherein the first category is common to both the criterion for classifying the users of the first company and the criterion for classifying the users of the second company, and the criterion for classifying the users of the first company differs in degree from the criterion for classifying the users of the second company.

2. The information processing device according to claim 1, wherein
the processor is further configured to use the model to identify an item in the second company that is common to an item for classifying the users of the first company into the first category, and generates the criterion by using the identified item.

3. The information processing device according to claim 1, wherein
the processor is further configured to use a model that is trained to learn a relationship between a label for each cluster obtained by clustering the users of the first company and a label for each cluster obtained by clustering the users of the second company to generate the criterion.

4. An information processing method executed by a computer, the method comprising:
a generation step of generating a criterion for classifying users of a second company that provides services on internet into a first category, from a criterion related to a keyword input frequency for classifying users of a first company into the first category, by using a model trained to learn a relationship between the criterion for classifying the users of the first company and a criterion for classifying the users of the second company; and
a providing step of providing the generated criterion to a first analysis device associated with the second company to generate statistical information based on the users of the second company that have been classified into the first category, wherein the first analysis device provides the generated statistical information to a second analysis device associated with the first company without providing the second analysis device access to personal information of the users of the second company, and wherein the first category is common to both the criterion for classifying the users of the first company and the criterion for classifying the users of the second company, and the criterion for classifying the users of the first company differs in degree from the criterion for classifying the users of the second company.

5. A non-transitory computer readable storage medium storing an information processing program
  causing a computer to execute:
  a generation procedure of generating a criterion for classifying users of a second company that provides services on internet into a first category, from a criterion related to a keyword input frequency for classifying users of a first company into the first category, by using a model trained to learn a relationship between the criterion for classifying the users of the first company and a criterion for classifying the users of the second company; and a providing procedure of providing the generated criterion to a first analysis device associated with the second company to generate statistical information based on the users of the second company that have been classified into the first category, wherein the first analysis device provides the generated statistical information to a second analysis device associated with the first company without providing the second analysis device access to personal information of the users of the second company, and wherein the first category is common to both the criterion for classifying the users of the first company and the criterion for classifying the users of the second company, and the criterion for classifying the users of the first company differs in degree from the criterion for classifying the users of the second company.

\* \* \* \* \*